United States Patent [19]

Hogan et al.

[11] Patent Number: 4,478,001
[45] Date of Patent: Oct. 23, 1984

[54] PROTECTIVE ENTRANCEWAY

[75] Inventors: Tanai N. Hogan, Orlando; James A. Woods, Winter Park, both of Fla.

[73] Assignee: Martin Marietta Corporation, Bethesda, Md.

[21] Appl. No.: 275,571

[22] Filed: Jun. 22, 1981

[51] Int. Cl.³ .............................................. E06B 7/00
[52] U.S. Cl. ........................................ 49/37; 49/68; 49/70; 135/93; 135/95; 296/162
[58] Field of Search ............... 49/68, 70, 37; 296/161, 296/162; 135/1 A; 14/71.5

[56] References Cited

U.S. PATENT DOCUMENTS 1,675,953  7/1928  Nichol ................................. 49/70 X
2,483,478  10/1949  Smelker ............................. 135/1 A
3,766,844  10/1973  Donnelly et al. ................... 49/68 X

FOREIGN PATENT DOCUMENTS 173637  12/1934  Switzerland ............................ 49/37

Primary Examiner—Kenneth Downey
Attorney, Agent, or Firm—Julian C. Renfro; William J. Iseman; Gay Chin

[57] ABSTRACT

The present invention relates to a protective entranceway contained in the outer door of a van, trailer or other shelter means. In one mode our device takes the form of a door operable about a vertical hinge line, and although thicker than an ordinary door, it serves in the manner of an ordinary door to provide closure for the shelter means at such time as no contamination is present. A platform is contained on the outer portion of our door, which is enabled to swing downwardly at the time of a contamination alert. A canopy that had been contained in the door in a folded condition is caused by downward movement of the platform to deploy and form a closed entranceway serving in a second mode of use to prevent contaminated air from entering the shelter means.

7 Claims, 12 Drawing Figures

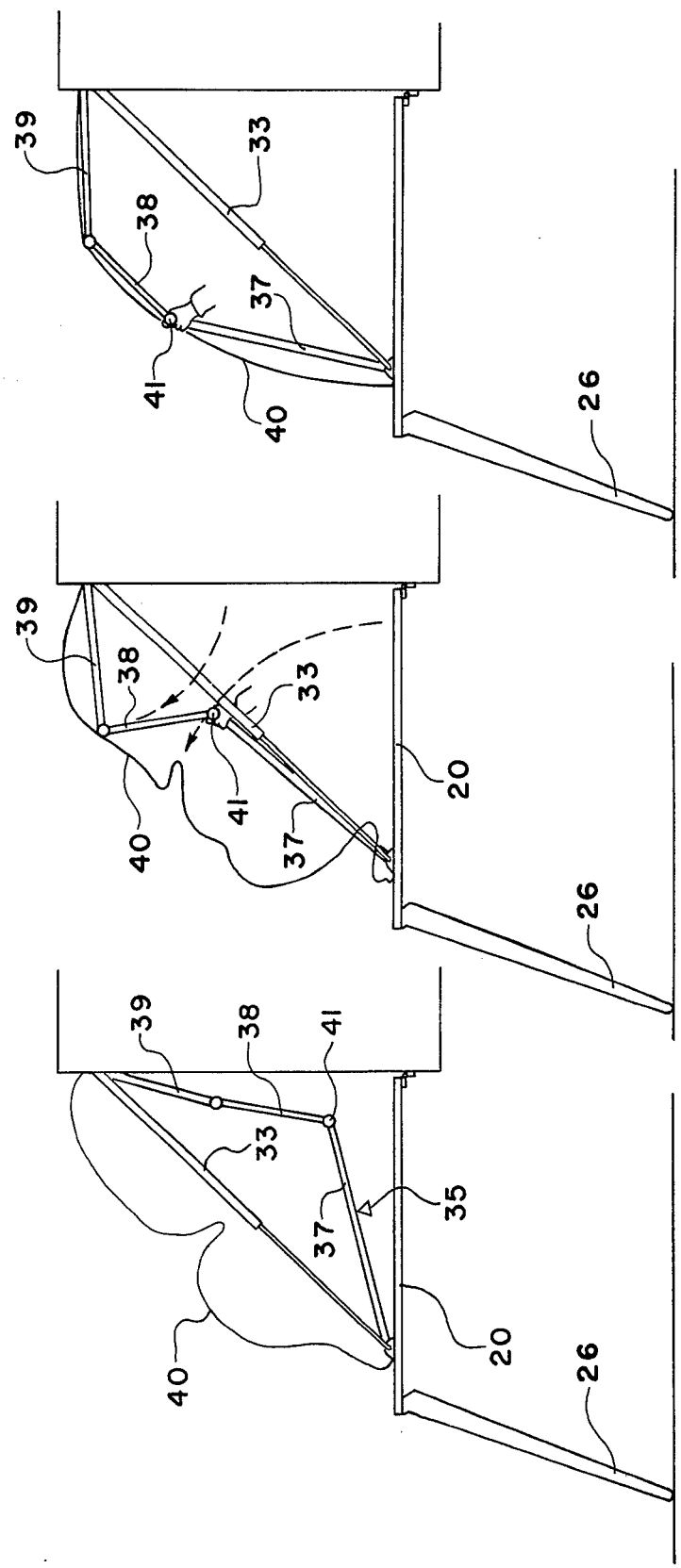

PROTECTIVE ENTRANCEWAY

TECHNICAL FIELD

The present invention relates to a protective entranceway utilized to prevent contamination of the air of a van, trailer or other shelter means. We provide a compound door operable about a vertical hinge line, and although comparatively thick, it serves in the manner of an ordinary door to provide a suitable closure for the shelter means at such time as no contamination is present. A platform is contained on the outer portion of our door, which is enabled to swing downwardly at the time of a contamination alert. A canopy that had been contained in our novel door in a folded condition is caused by downward movement of the platform to deploy and form a closed entranceway serving to prevent contaminated air from entering the shelter means.

BACKGROUND ART

It is well known that the command and control equipment used in the field in support of weapon systems contains a considerable amount of sensitive electronic equipment. This equipment must be protected from nuclear, biological and chemical agents, as must the people utilized for operating the equipment.

To this end the sensitive equipment is usually mounted in a container or shelter that must, in the presence of damaging nuclear, biological and chemical contaminates, be maintained at a positive pressure, utilizing cleaned, filtered air. This arrangement obviates the necessity for the users of the equipment having to wear cumbersome protective clothing, and protects the equipment from degradation or corrosion which could render it inaccurate, if not inoperable.

It is well known that the entrance to such a shelter or van cannot be a simple door arrangement, for each time the door is opened, contaminated air would enter the protected area as positive pressure is lost. Accordingly, it has been customary to utilize a protective entrance to provide a pressurized transitional area between the protected enclosure and the surrounding contaminated atmosphere, in order that personnel can enter and exit the protected compartment without loss of compartment pressurized protection. In addition, it can be assured that the individual is substantially free of contamination prior to his leaving the protective entranceway and entering the shelter means. The individual remains in the entranceway for sufficient time for the filtered positive pressure air to completely exchange with the potentially contaminated air that entered the entranceway with the individual.

Speed is a most important factor in the deployment of a protective entranceway, for should through the use of ordinary doors, contaminates be allowed to enter the protected area of the shelter means, there exists no effective means for the rapid decontamination of such area.

The M-10 entranceway in use for many years cannot respond to the requirement for rapid deployment. This is true for the several reasons that the services of at least three people are required in order that the necessary platform be assembled, and the M-10 be brought up from storage. Then, even when these ingredients are on hand, it takes the three people approximately thirty minutes to set up that type of protective entranceway.

As is obvious, at the time of an alert, manpower may not be available or the vehicle responsible for carrying the platform and/or M-10 may in fact not be nearby. In short, the protective entranceways of the prior art were simply not responsive to the needs of modern mobile weapon systems, particularly with regard to the time factor.

It was to meet the need for a protective entranceway integral with the van, container or other shelter means that could be rapidly deployed by one person, without any heavy lifting or painstaking effort being involved, that the present invention was evolved.

DISCLOSURE OF THE INVENTION

We have designed a novel compound door for a shelter, usable in a first mode as an ordinary door in instances in which there is no threat from any nuclear, biological or chemical contaminates. Although this door is thicker than a regular shelter door, it is entirely operable by a person of ordinary size and strength.

When a threat from any of the foregoing sources occurs, however, it is but a simple matter for our compound door to be opened up such that it automatically provides the protective entranceway.

What had been a part of the outer surface of our compound door hinges downwardly about a horizontal hinge line, in a second mode of use, to form a suitable walkway or platform. On each side of this walkway are folded, structural members, with which is associated a canopy of material impervious to nuclear, biological or chemical contaminates. This canopy defines a closed volume of appropriate size, and contained in this canopy is a flexible doorway to permit engress from the outside. Importantly, an inner door remains in the vertical position, which inner door is hinged about a vertical hinge line in the frame of the compound door and it is typically through a valve means in this inner door that the clean, filtered air from the shelter or van is supplied under pressure into the protective entranceway.

It is thus to be seen that we have provided a highly effective yet lightweight entranceway that is always in position for deployment at a moment's notice, and which is not dependent for its utility upon the availability of several people or the nearby storage of needed components.

It is therefore a primary object of the present invention to provide a foldable, rapidly deployable protective entranceway of low cost and dependable construction, in which all the essential ingredients are self-contained.

It is another object of our invention to provide a protective entranceway employing a compound door usable in one mode as an ordinary door, and also serving as a storage means for a platform and attached canopy, which platform and canopy can be rapidly and almost automatically deployed in the event of a contamination threat.

These and other objects, features, and advantages will be more apparent as the description proceeds.

BRIEF DESCRIPTION OF THE DRAWINGS

FIG. 6 is made up of several related views together representing the sequence followed in deploying the platform and canopy support frame;

BEST MODE FOR CARRYING OUT THE INVENTION

Figure 1:
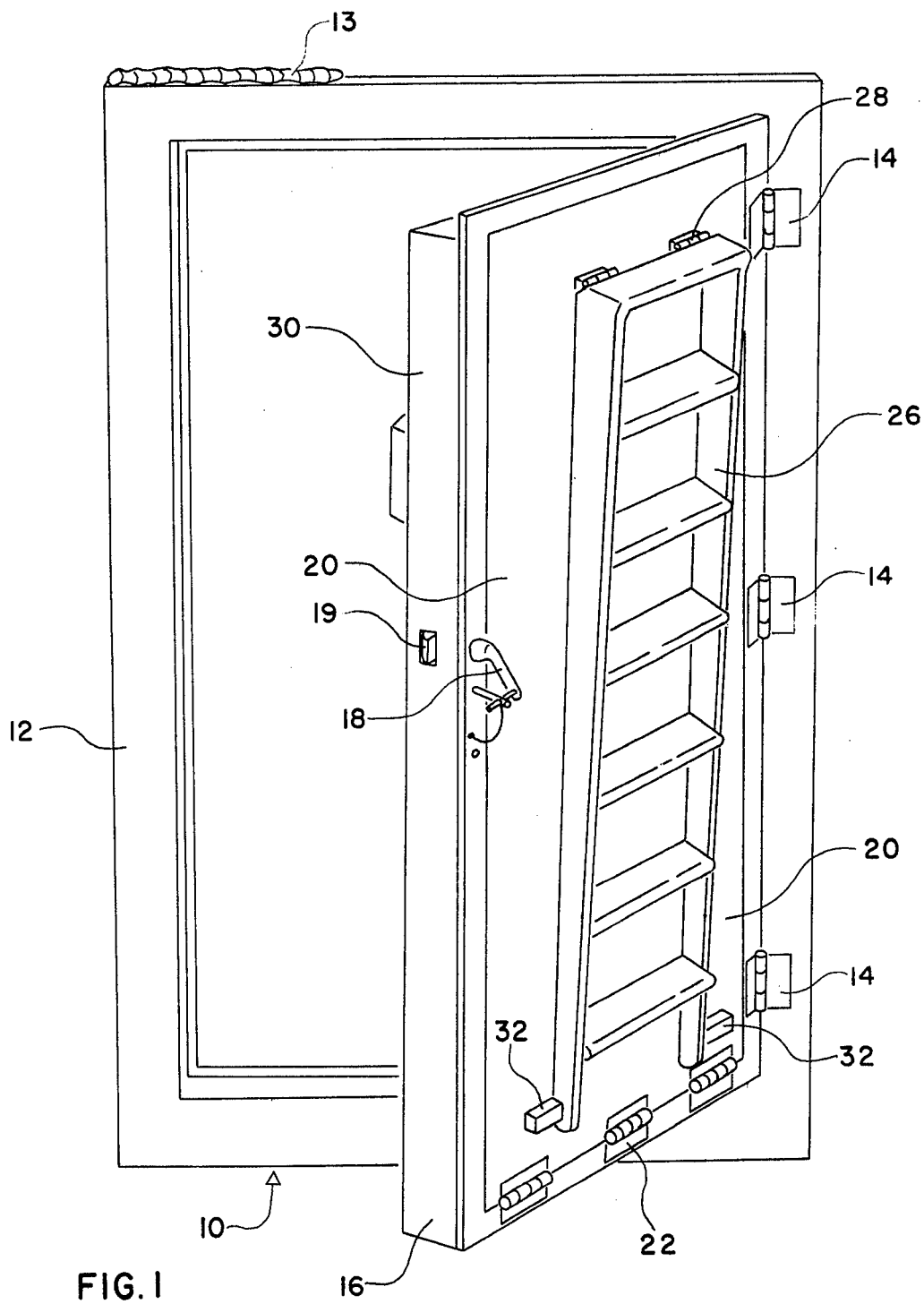
FIG. 1 is a perspective view showing the compound door moved to a position in which ordinary ingress or egress from the shelter means is readily permitted.

Turning to FIG. 1, it will be seen that we have illustrated our novel protective entrance 10 in its non-deployed form, which invention principally involves a main frame assembly 12 that is designed to be secured around an aperture in a van, container, building, or other form of shelter means. The main frame assembly 12 may be secured in place by bolting, riveting or other means, but in most instances by welding. In the interests of lightness, many of the components of our novel protective entrance are made of aluminum, so if the main frame assembly 12 is of aluminum it would preferably be secured in position by heliarc welding. Typical weld detail is shown at 13.

Mounted on hinges 14 on the main frame assembly is a main door assembly 16, which may serve as the principal door of the van, shelter or building, with a latch assembly 19 being provided so that the main door assembly may be secured and latched in the closed position whenever such is desirable. A rotatable handle 18 is provided on the exterior of main door assembly 16 in order that release of latch 19 may be easily accomplished.

Although the main door assembly 16 is typically several inches thick, the hinges 14 are of substantial size and the door is fitted carefully with respect to the main frame assembly such that the opening and closing of the main door assembly can be accomplished by ordinary size people and by the exertion of normal forces.

Figure 3:
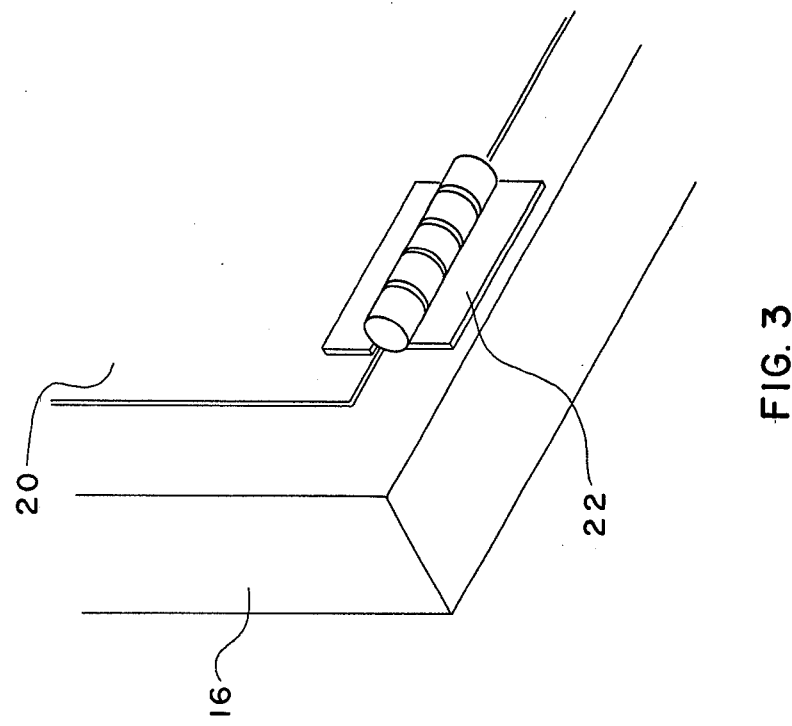
FIG. 3 is a fragmentary perspective view revealing hinge detail associated with support of the platform.
Figure 2:
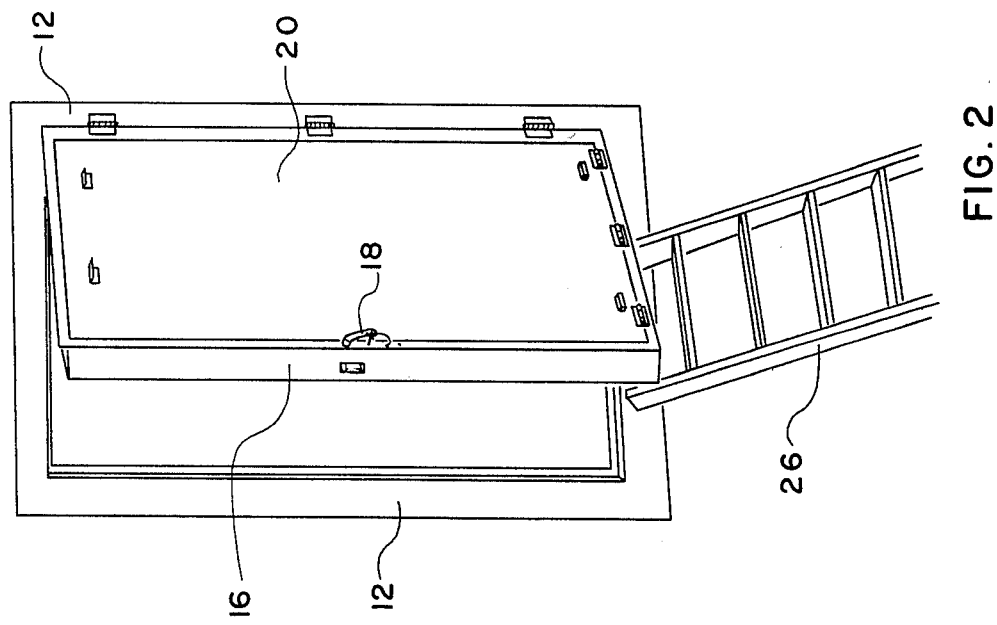
FIG. 2 is a view generally similar to FIG. 1, but showing the steps having been removed from the door and employed for facilitating entrance into the shelter area.

A rectangularly shaped platform 20 is closely associated with the outside of the main door assembly, with this platform normally remaining in the non-deployed or essentially vertical position shown in FIGS. 1, 2 and 3. Large hinges 22 are utilized at the bottom of the main door assembly to form the support for the platform 20, with suitable means being utilized at the top of the main door assembly in order that the platform may normally be maintained in the non-deployed position. Details of the platform retention and release means will be discussed hereinafter.

Secured on the outside of platform 20 is a series of steps 26 that may take the form of a ladder. Two or more hinges 28 at the upper end of the steps 26 are utilized to secure the ladder to an upper part of the platform, and spring-rod restraint pins 32 are utilized at the lower ends of the steps to prevent the steps from swinging away from the platform and main door assembly at inopportune times. Optionally, the steps may be removably secured to the platform without using hinges.

If hinges 28 are used, they preferably are of a type having a loosely fitting hinge pin, such that the hinge pins can be pulled and the steps 26 readily freed from the platform 20. In one type of use, the steps can then be placed at the bottom of the main frame assembly in the manner shown in FIG. 2, thus to provide ready ingress and egress from a van or shelter while the main door assembly is being used as an ordinary door.

FIG. 3 is a view revealing the type of hinge 22 preferred for the mounting of the platform on the lower edge of the main door assembly. However, other forms of platform support may be utilized. When hinges are utilized, they are rugged, and adequately support the platform when it is moved away from a position coinciding with the outer surface of the main door asssembly 16. The exterior of the door 16 is preferably recessed to receive the platform 20; note FIG. 8.

Figure 5:
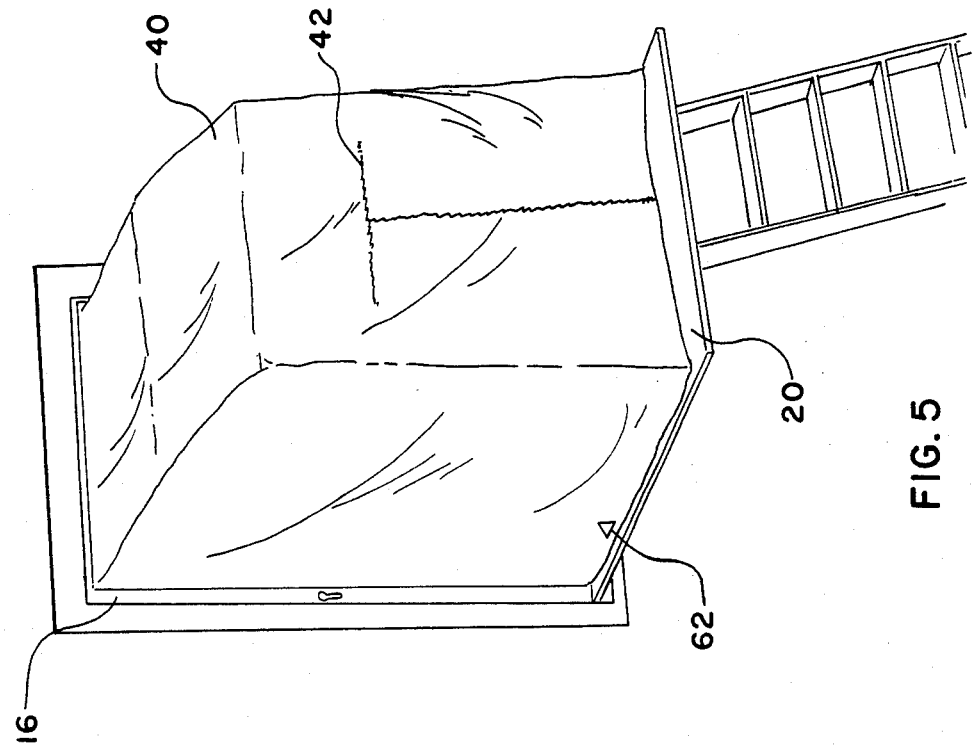
FIG. 5 is a view similar to FIG. 4 but showing the canopy in its operative position.
Figure 4:
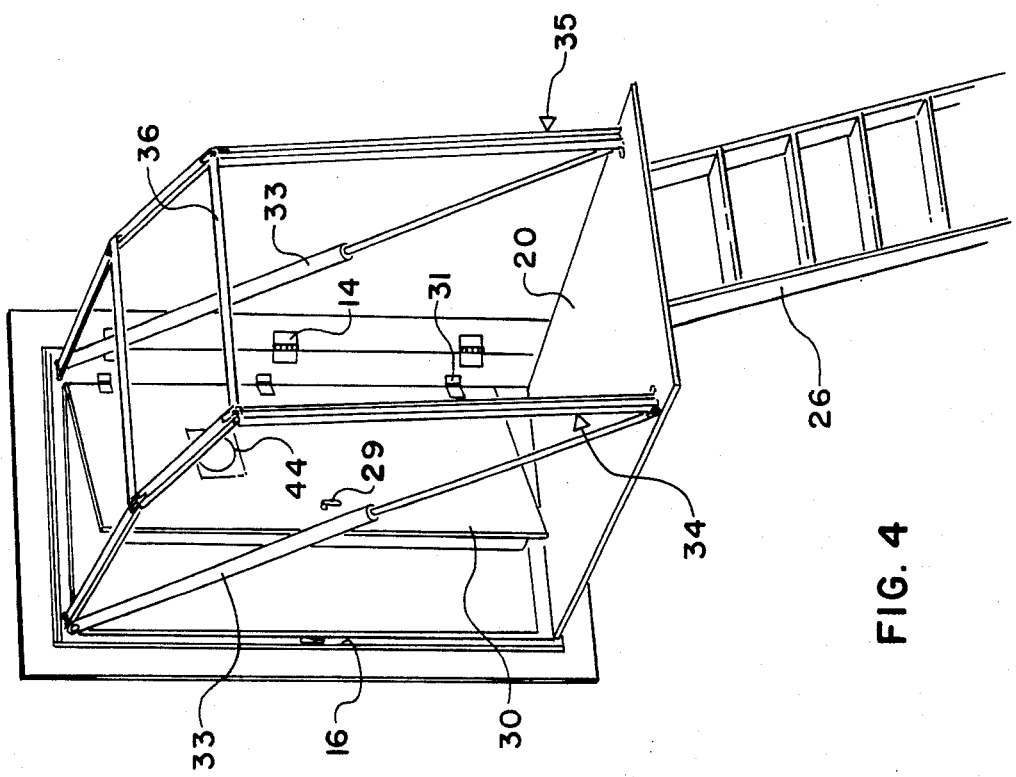
FIG. 4 is a perspective view showing the platform in its deployed position, with the canopy being omitted to reveal support frame detail.

Turning to FIG. 4, it will be seen that the platform 20 has been released by operation of platform latch assembly 21 (See FIG. 9) and slowly allowed to pivot away from its confined position in the main door assembly, into a generally horizontal position. Pneumatic struts 33 slow the descent of the platform, and in this example, the steps 26 have pivoted about their hinges 28 into an operative position at the outer end of the platform 20. The light, hinged structural assemblies 34 and 35 on the left and right sides of the platform form a connection between the part of the platform remote from the hinge means 22, and the upper portion of the main door assembly. Two or so members 36 bridge between the assemblies 34 and 35. Also revealed in FIG. 4 is an inner door 30 supported by hinges 31 on the frame of the main door assembly. The inner door is provided with a suitable latch 29 as well as a positive pressure relief valve assembly 44. This door represents a closure for the entrance to the van or shelter when the platform has been deployed into the position shown in FIGS. 4 and 5. In FIG. 5, a canopy 40 is shown in position, supported by the assemblies 34 and 35. It is because of the inclusion of components such as platform 20 and canopy 40 in the main door assembly 16 that we may choose to refer to it as a compound door.

The series of sketches constituted by FIG. 6a, FIG. 6b and FIG. 6c show the procedure by which the platform 20 is moved into the extended position, and the folding assemblies 34 and 35 moved into a canopy supporting mode.

More particularly, in FIG. 6a the members 37, 38 and 39 constituting structural assembly 35 are shown in a non enclosure supporting mode, whereas in FIG. 6b the user has moved the member 39 into a substantially horizontal position and is in the act of moving the hinge 41 located between members 37 and 38 outwardly. In FIG. 6c, the user has pushed the hinge 41 beyond a straight line position of members 37 and 38 so as in effect to form a type of toggle. This serves to lock the assembly 35 tightly in the extended position. The procedure is of course repeated for assembly 34.

As can be seen in FIG. 6c, but in more detail in FIG. 5, canopy 40 is supported above the platform 20 by the structural assemblies utilized on the left and right sides of the platform, with the canopy being high enough to provide proper head clearance. An opening 42 is provided on the front of the canopy such that users of the van or shelter can readily move into and out of the protective entrance.

The canopy 40 may be maintained normally in a sealed condition by the use of a zipper or snaps provided at the opening 42. Other possibilities include the use of velcro members that serve to keep the flaps of the opening 42 in a normal closed condition. Still other alternatives include the use of a "pop out" type opening in which reclosure is readily brought about each time after use.

Although the hinged structural assemblies 34 and 35 serve to provide a degree of support for platform 20, we prefer to have the pneumatic struts 33 serve as the principal support for the outer end of the platform. As will be discussed hereinafter, the pneumatic struts are also of assistance in the reclosing of the platform 20.

Figure 7:
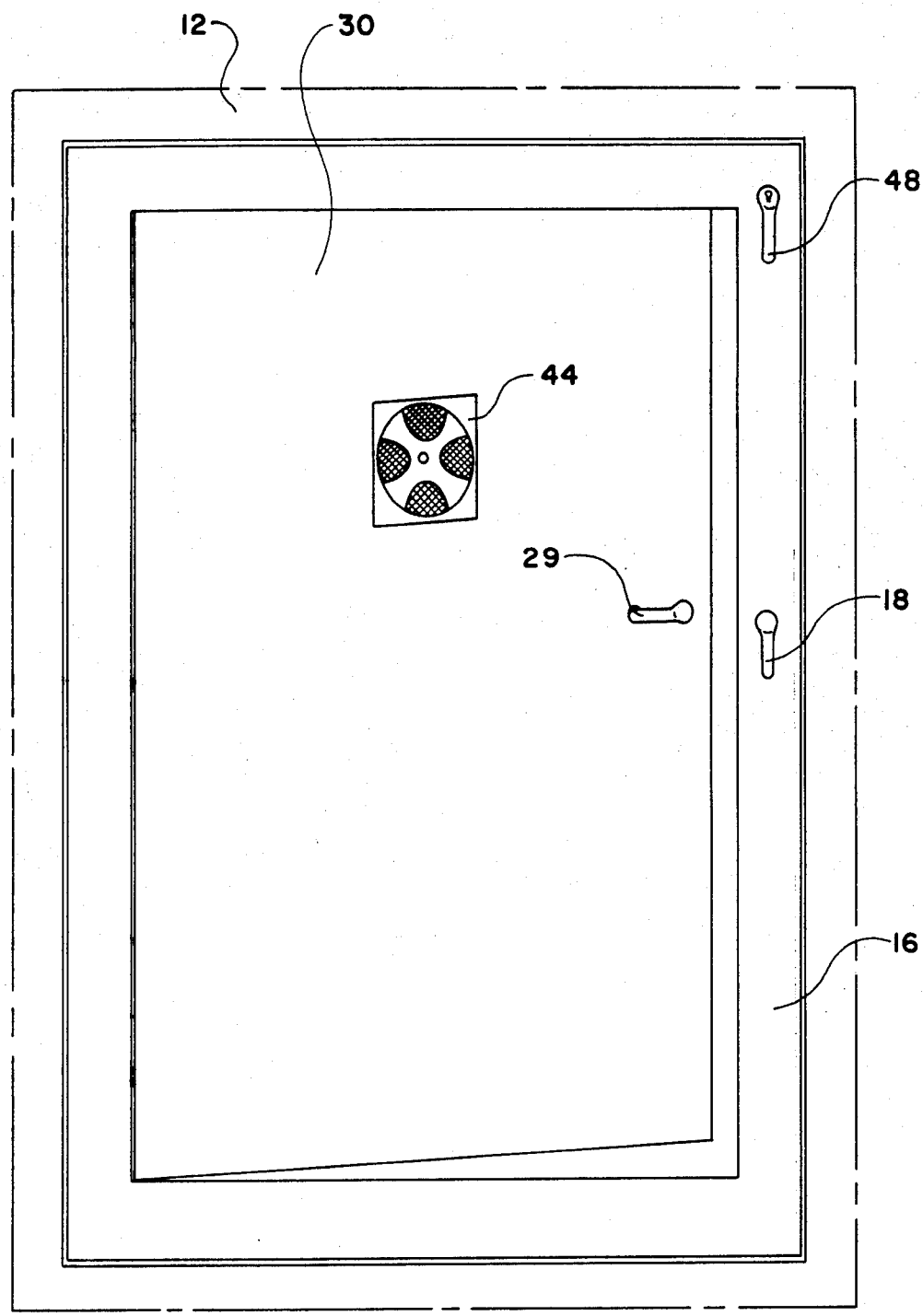
FIG. 7 is a view from the interior of the shelter means, illustrating the appearance of the inner door.

Turning to FIG. 7, it will there be seen that we have illustrated the interior part of the main door assembly 16, with this view revealing the interior part of the handle 18 previously shown in FIG. 1. The interior and exterior handles 18 each serve to operate the latch mechanism 19, but the interior handle 18 cannot function, in the preferred arrangement, to release the platform 20. Platform release by the use of exterior handle 18 will be discussed at greater length hereinafter. Also shown in this figure is the interior portion of the inner door 30, including the positive pressure relief valve assembly 44, by which the air inside canopy 40, when the canopy has been extended, can be purged.

Additionally shown in FIG. 7 is the handle 29 by which the latching of the inner door is controlled, and the platform release handle 48, by means of which the platform 20 may be released from the stored or vertical position from inside the shelter means. A lock may be associated with handle 48 to prevent unauthorized deployment of the platform.

Figure 8:
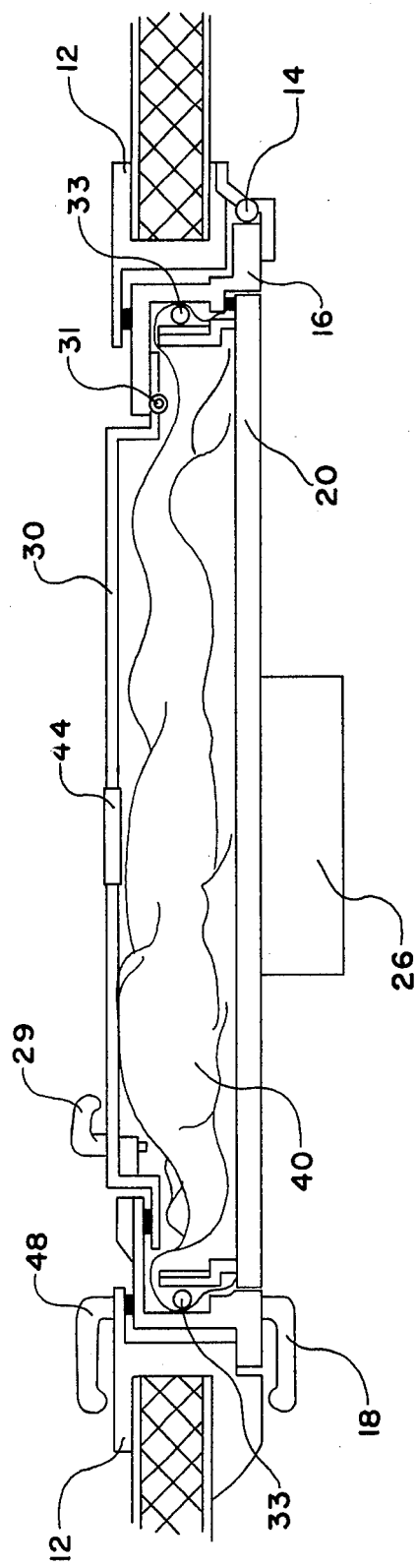
FIG. 8 is a cross sectional view of the compound door as seen from above.

Turning to FIG. 8, it will be noted that we here have provided a cross-sectional view of the main frame assembly with the platform 20 in the stowed position. The outer part of the platform appears at the bottom of this view, with the detachable steps 26 mounted thereon. Preferably the exterior of the main door assembly is recessed as shown in this figure in order that the platform will have a flush fit therewith.

In this exemplary illustration, the canopy 40 is in the folded or stowed position, being retained in the inward direction by the inner door 30. Also visible in this figure are certain operational details, including the pneumatic struts 33, and the hinge 31 of the inner door.

Figure 9:
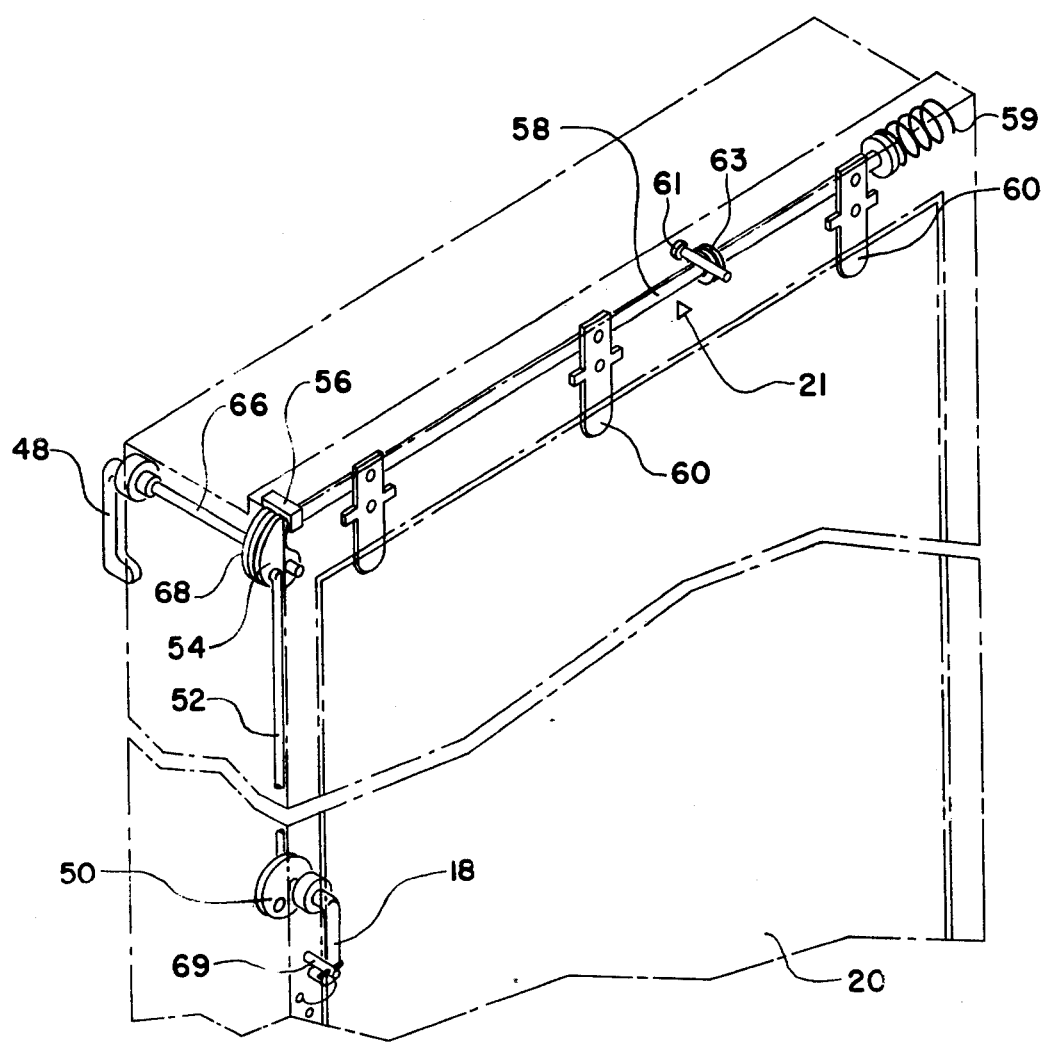
FIG. 9 is a perspective view of the upper part of the compound door, with certain portions set forth in phantom lines in order that significant inner detail will be revealed.

Turning to FIG. 9, illustrated here is the mechanism associated with the external handle 18 in order that rotation of the handle is one direction from a location outside the shelter can cause the unlatching of the door assembly 16, such that assembly 16 can be used as an ordinary door. However, when handle 18 has been rotated in the other direction, the release of the platform 20 from the folded position is accomplished by the platform release means 21.

A cam 50 is provided on the shaft directly associated with the exterior handle 18, and operably attached to the cam 50 is a vertically disposed push rod 52 that extends upwardly inside door 16 to an upper, pivotally mounted cam 54. When the handle 18 is turned in the clockwise direction, as viewed in FIG. 9, cam 50 also turns clockwise, causing upward movement of the push rod, and in turn a clockwise movement of the upper cam 54. This causes the cam 54 to come into contact with the striker plate 56 and causes a lateral movement thereof.

On the other hand, when the handle 18 is turned counterclockwise, it then serves to operate only the latch mechanism 19 of main door assembly 16 in the releasing direction, for rotation of the cam 54 away from the striker plate 56 does not accomplish any movement of the striker plate.

It is to be noted that striker plate 56 is mounted on a horizonally movable release rod 58, with this rod being operably connected to the tops of a plurality of centrally pivoted release dogs 60 that serve as retention means for the platform 20. The pivots of the release dogs are mounted on the upper interior portion of the door frame, and the long dimension of these dogs is normally vertical, such that their lower portions normally are in a position to intercept the upper edge of platform 20. Suitable recesses are provied in the upper edge of the platform, into which the lower portions of the dogs can extend. When as a result of door handle movement, the striker plate and release rod have been moved against the bias of spring 59 to the right as viewed in FIG. 9, this causes a clockwise rotation of the dogs 60, such that the platform is released. The spring 59 serves normally to bias rod 58 to the left as viewed in this figure. A stop or pin 61 on the frame of door 16 is positioned to intercept collar 63 mounted on rod 58 at such time as the dogs 60 have been moved to their vertical positions shown in FIG. 9. The components 61, 63 keep the dogs from moving counterclockwise past their vertical positions under the influence of spring 59.

Release of platform 20 can also be accomplished from the interior of the shelter, this being brought about by manipulation of the handle 48. The handle 48 is mounted on a rod 66, and on the far end of this rod is rigidly mounted a cam 68. This cam is preferably disposed in a plane parallel to the plane of the cam 54, and is located closely adjacent such other cam.

As should be apparent, manipulation of the handle 48 to rotate the dogs 60 and therefore to release the platform 20 is effective only in the direction causing the striker plate 56 to move to the right as viewed in FIG. 9.

It is important to note that the cam 54 may be mounted on the rod 66, but the cam 54 is loosely supported on this rod so that rotation of handle 18 does not cause rotation of handle 48 and rod 66, nor does the rotation of handle 48 cause rotation of handle 18.

Figure 9A:
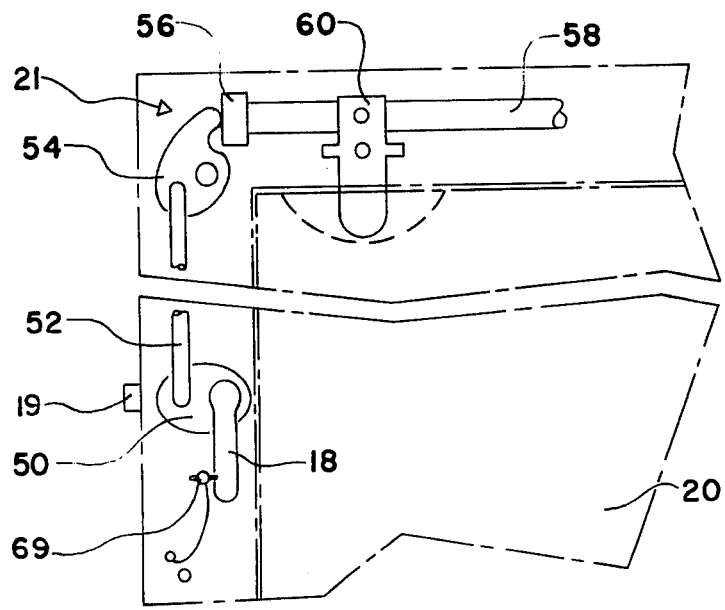
FIG. 9A is a fragmentary view showing the outer handle, main door latch operated thereby, and the means for preventing undesired deployment of the platform.

FIG. 9A shows some of the aforementioned door details with additional clarity, and also includes the illustration of means utilized on the outside of the compound door to prevent a user non-intentionally releasing the platform. By way of example, a quick disconnect T-handle 69 can be releasably mounted in a position on the door that would normally obstruct a clockwise rotation of handle 18 as viewed in FIG. 9A. Then when the platform 20 is intended to be released, the T-handle is removed, and the handle 18 rotated in the clockwise direction to cause retraction of the dogs from the edge of the platform. If desired, a lock can be put on the T-handle to assure that no unauthorized release of the platform is brought about. A suitable small hole is of course provided in the door adjacent the handle 18, into which the T-handle can be releasably received.

As our novel, self contained entranceway, it is to be noted that canopy 40 is configured such that its lower portion can be attached around the perimeter of platform 20 as illustrated in FIG. 5, with the left, right and upper portions of the canopy being tightly attached to the main door assembly 16, thus to form entranceway 62. Machine screws may be used for securing the canopy to platform 20 and door 16, although other types of fasteners may be utilized if preferred. We prefer to use butyl rubber or TEDLAR as the material out of which the canopy is made because of its lightweight characteristics and its resistance to penetration by chemical agents.

We envision being able in many instances to clean the canopy 40 sufficiently well after exposure to contaminants, that it may thereafter be refolded into the main door assembly. Alternatively, however, the canopy may be installed using zippers, snaps or the like, so that a contaminated or damaged canopy can be entirely removed from the platform and door, and a new one quickly substituted.

As previously mentioned, filtered air is supplied from the shelter means into the entranceway formed by the deployed canopy 40. This supply of air is typically accomplished through the positive pressure relief valve 44 of the door 30. The pressure inside the entranceway 62 is typically maintained at a pressure corresponding to a few inches of water.

In order to fold up the protective entrance for travel, the operator releases the support members 34 and 35. He proceeds in the reverse order of the sequence illustrated in FIG. 6, that is, he first moves the joint 41 inwardly such that the components of the support assembly can be folded up. The canopy material is then positioned by the operator preparatory to pushing the platform 20 back up into the compound door. When the platform has been returned to the folded or non-deployed position, the platform release means 21 is actuated by the door handle so as to being about the reengagement of the edge of the platform by dogs 60 such that the platform is locked in the folded position.

The pneumatic struts 33 not only served during the deployment of the platform to cushion the shock of the downward movement, but also these components provide assistance when the platform is being returned to the folded position. This is because check valves are utilized in the struts 33 such that while outward movement of the struts is opposed, inward movement of the struts meets very little opposition.

Pneumatic door shock absorbers to perform this function are readily available through commercial sources (reference McMaster-Carr #1265D12). This pneumatic device provides an air cushion at the base of the inner tube assembly which can be compressed to absorb more than 500 pounds of force per tube and remain flexible at −70 degrees F. The overall length and stroke is selected to accomodate platform 20, and the installation of pneumatic shock struts 33 to platform 20 will be such as to properly accomodate the stroke of the pneumatic shock device.

We claim:

1. For use in connection with a shelter means, a novel compound door hinged about an essentially vertically disposed hinge line, said compound door being usable in one mode as an ordinary door, and in another mode as part of a protective entranceway, a platform normally serving as a portion of the exterior of said door, and capable of being lowered at the option of the user from an essentially vertical position, into an essentially horizontal position such that it can serve as a walkway, and a canopy for utilization as a closed entranceway over said platform at such time as said platform has been lowered into the essentially horizontal position.

2. The compound door as defined in claim 1 in which said canopy is contained in said compound door, and deploys semiautomatically into a closed entranceway upon said platform being lowered.

3. The compound door as defined in claim 1 in which said platform is hinged to the bottom of said compound door, and folding structural members on each side of said platform deploy at the time of lowering of said platform, so as to form a support for the canopy forming the closed entranceway.

4. The compound door as defined in claim 3 in which manually operable platform release means enable deployment of the entranceway at behest of user.

5. For use in connection with a shelter means, a novel compound door hinged about an essentially vertically disposed hinge line, said compound door being usable in one mode as an ordinary door, and in another mode as part of a protective entranceway, a platform normally serving as a portion of the exterior of said door, and capable of being lowered at the option of the user from an essentially vertical position, into an essentially horizontal position such that it can serve as a walkway, and a canopy for utilization as a closed entranceway over said platform at such time as said platform has been lowered into the essentially horizontal position, an inner door hinged on the frame of said compound door serving as a closure for the inner end of said entranceway.

6. A protective entranceway for use with a van, container, or other shelter means comprising a compound door, said door being hinged about a vertical axis and capable of being utilized as an ordinary door at the time of no contamination threat, when ingress into, or egress from the shelter means is desired, an elongate platform normally serving as a portion of the exterior of said compound door, the lower edge of said platform being pivotally supported adjacent the bottom of said compound door, which pivotal support represents a substantially horizontal axis about which the platform can move when being deployed, platform release means for normally retaining said platform in a non-deployed condition on said compound door, and means for causing operation of said release means at the time of a contamination alert, when the platform is to be rotated downwardly into a generally horizontal position, lightweight structural means forming a foldable connection between the frame of said compound door and a part of said platform remote from the pivotal support of said platform, said lightweight structural means forming a support for a canopy through which a person intent upon entering the shelter means can enter, and in which canopy, positive pressure can be maintained so that contaminated air can be purged from the entranceway formed by the canopy before he or she enters the shelter means.

7. A protective entranceway for use with a van, container, or other shelter means comprising a compound door, said door being hinged about a vertical axis and capable of being utilized as an ordinary door at the time of no contamination threat, when ingress into, or egress from the shelter means is desired, an elongate platform normally serving as a portion of the exterior of said compound door, the lower edge of said platform being pivotally supported adjacent the bottom of said compound door, which pivotal support represents a substantially horizontal axis about which the platform can move when being deployed, platform release means for normally retaining said platform in a non-deployed condition on said compound door, and means for causing operation of said release means at the time of a contamination alert, when the platform is to be rotated downwardly into a generally horizontal position, lightweight structural means forming a foldable connection between the frame of said compound door and a part of said platform remote from the pivotal support of said platform, said lightweight structural means forming a support for a canopy through which a person intent upon entering the shelter means can enter, and in which canopy, positive pressure can be maintained so that contaminated air can be purged from the entranceway formed by the canopy before he or she enters the shelter means, said canopy being stored in an interior portion of the compound door when the platform has not been deployed, and an inner door supported by said compound door being utilized for controlling ingress into the shelter means when the platform has been deployed and the entranceway set up.

* * * * *